(12) United States Patent
Helmuth et al.

(10) Patent No.: US 9,387,805 B2
(45) Date of Patent: Jul. 12, 2016

(54) BATTERY COMPARTMENT COVER

(71) Applicant: UTILIMASTER CORPORATION, Bristol, IN (US)

(72) Inventors: Glen R. Helmuth, Bourbon, IN (US); Paul Rine, Elkhart, IN (US)

(73) Assignee: Utilimaster Corporation, Bristol, IN (US)

( * ) Notice: Subject to any disclaimer, the term of this patent is extended or adjusted under 35 U.S.C. 154(b) by 0 days.

(21) Appl. No.: 14/862,451

(22) Filed: Sep. 23, 2015

(65) Prior Publication Data
US 2016/0090045 A1 Mar. 31, 2016

Related U.S. Application Data

(60) Provisional application No. 62/055,336, filed on Sep. 25, 2014.

(51) Int. Cl.
*B60R 3/02* (2006.01)
*B62D 25/10* (2006.01)
*B60R 16/04* (2006.01)

(52) U.S. Cl.
CPC . *B60R 3/02* (2013.01); *B60R 16/04* (2013.01); *B62D 25/105* (2013.01)

(58) Field of Classification Search
CPC ......... B60R 3/02; B60R 16/04; B62D 25/105
See application file for complete search history.

(56) References Cited

U.S. PATENT DOCUMENTS

| | | | | |
|---|---|---|---|---|
| 2007/0049095 A1* | 3/2007 | Kikuchi | ............ | H01M 2/1083 439/342 |
| 2007/0182121 A1* | 8/2007 | Kraimer | ............ | B66F 9/07545 280/166 |
| 2013/0087590 A1* | 4/2013 | Lee | ........................... | B60R 5/04 224/496 |
| 2014/0123910 A1* | 5/2014 | Rorke | ................... | A01K 1/035 119/849 |
| 2015/0083023 A1* | 3/2015 | Hirashima | ........... | B61D 23/025 105/447 |

\* cited by examiner

*Primary Examiner* — Faye M Fleming
(74) *Attorney, Agent, or Firm* — Barnes & Thornburg LLP

(57) ABSTRACT

Illustratively, an embodiment of the present disclosure provides a vehicle that includes an entrance to an interior compartment. A step assembly is located adjacent the entrance of the vehicle and includes at least one step and at least one riser. The at least one riser is attached to and substantially perpendicular to the at least one step. The step assembly also includes an opening that allows access behind the step assembly. A lid is provided that includes a hinge to allow selective movement of the lid between open and closed positions with respect to the opening in the step assembly. A securement is attached to the underside surface of the lid to hold the lid to the step assembly. This securement, however, does not extend upward from the top surface of the lid.

22 Claims, 5 Drawing Sheets

BATTERY COMPARTMENT COVER

RELATED APPLICATIONS

The present application relates to and claims priority to U.S. Provisional Patent Application Ser. No. 62/055,336, filed on Sep. 25, 2014. The subject matter disclosed in that provisional application is hereby expressly incorporated into the present application.

TECHNICAL FIELD AND SUMMARY

The present disclosure relates to a delivery/cargo vehicle, and particularly to a new battery compartment access cover for the cargo/delivery vehicle.

Delivery/cargo vehicles are typically trucks such as box trucks, walk-in vans, utility vans, cargo vans, and the like. Vehicles such as these often include a step-well which is an internal compartment located underneath steps between an interior occupant compartment and the exterior of the vehicle. Step-wells are convenient since they are positioned at the ingress/egress portion of the vehicle. They are, thus, inherently easily accessible. This means that vehicle consumables, such as its battery, may be easily accessed when located in such a step-well. This battery compartment located in the step-well is also convenient because its cover is simply a hinged riser and tread portion in the vehicle steps. All an operator or a mechanic needs to do is lift up the hinged step section to reveal the battery compartment in the step-well underneath.

In addition to being hinged, the step cover is also secured into place by different mechanical means. Examples of such means include wing nuts attached to threaded bolts or straps. Both of these mechanical means attach the step cover to a frame located at the periphery of the step-well's opening. A disadvantage of these mechanical attaching means, however, is first, alignment problems may develop between the step cover and the frame to the extent either the wing nuts or straps secure to both. For example, a threaded bolt extends from the frame and is disposed through a hole in the step cover. Typically there are two threaded bolts along the periphery of the lower frame of the step-well. Unfortunately, aligning the openings with the bolts is easier said than done—meaning it is not always accomplished. And further, when aligned it takes time to loosen or tighten the wing nuts onto the bolts. Similarly, if using straps a similar issue exists with alignment—this time attaching the strap to a bracket on the frame. Second, both wing nuts and straps present a potential trip hazard, since they both extend from the bottom of the step riser and toward the adjacent lower step.

The present disclosure provides a cover system for a step-well compartment, such as a battery compartment, that no longer requires any protruding parts to align and secure the riser to the adjacent tread. The present disclosure provides a cover that shows no appreciably visible signs of a securement means. In one embodiment, the step cover is hinged at one end to flip the steps up and down to reveal or conceal the compartment underneath. One or more magnets may be attached to either the frame or the door to magnetically hold the door in place. It is appreciated that, if needed, a piece of metal that is magnetically attracted to the magnet may be attached to the cover opposite the magnet to provide additional holding force if the metal used for the step cover is not sufficient. This means there may be no showing or loose parts or alignment issues. The magnetic closure also produces a consistent compression seal over time, when the step door is secured to the frame of the compartment.

Another illustrative embodiment of the present disclosure provides a vehicle which comprises an entrance to an interior compartment. A step assembly is located adjacent the entrance of the vehicle and comprises at least one step and at least one riser. The at least one riser is attached to and substantially perpendicular to the at least one step. The step assembly includes an opening that allows access behind the step assembly. The opening is formed from both a portion of the at least one riser and a portion of the at least one step. The at least one riser and the at least one step are configured to attract a magnetic force or produce a magnetic force. A lid comprises an at least one step section and an at least one riser section. The lid includes a hinge that allows selective movement of the lid between open and closed positions with respect to the opening in the step assembly. The lid covers the opening in the step assembly when in the closed position such that the at least one step section rests on the portion of the at least one step adjacent the opening, and the at least one riser section abuts the portion of the at least one riser adjacent the opening. The at least one step section and the at least one riser section each also includes a top surface and an underside surface. A securement is attached to the underside surface of either or both the at least one step section and the at least one riser section. The securement is either a magnet which includes a magnetic force, or a material that attracts a magnetic force. The attraction between the at least one step and the at least one riser to the lid secures the lid to the at least one step and the at least one riser. There is no securement structure extending from the top surfaces of either the step section or the riser section.

In the above and other illustrative embodiments, the vehicle may also comprise: the lid being hingedly attached to the at least one riser by the hinge; the at least one riser section of the lid including first and second riser sections, and the at least one step section being located between the first and second riser sections; wherein the step assembly includes a second riser and the step is located between the at least one riser and the second riser; the step assembly including an opening that allows access behind the step assembly; the opening being formed from the portion of the at least one riser, the portion of the at least one step, and a portion of the second riser; the hinge of the lid is attached to the second riser section of the lid and the portion of the second riser of the step assembly to allow selective movement of the lid between open and closed positions with respect to the opening in the step assembly; the securement being a magnet which includes a magnetic force attracted to the at least one step and the at least one riser; the securement being not substantially visible above the top surface of the at least one step and riser sections; behind the opening being a battery compartment; behind the opening being storage area housing structures selected from the group consisting of engine, transmission, generator, and storage compartment; the step assembly being in the form of a step-well; the portion of the at least one riser and the portion of the at least one step forms a periphery about the opening that includes a frame; the underside of the lid including a plurality of receiver plates configured to engage at least one magnet located on the frame; and a seal located about a periphery of a portion of an underside of the lid and configured to block debris.

Another illustrative embodiment of the present disclosure provides a vehicle that comprises an entrance to an interior compartment of the vehicle. A step assembly is located adjacent the entrance of the vehicle and comprises at least one step and at least one riser. The at least one riser is attached to and substantially perpendicular to the at least one step. The step assembly includes an opening that is formed in a portion of the at least one riser. A lid comprises an at least one riser section. The lid also includes a hinge that allows selective movement of the lid between open and closed positions with respect to the opening in the step assembly. The at least one riser section of the lid covers the opening in the step assembly when in the closed position, and includes a top surface and an underside surface. A securement is located between the underside surface of the at least one riser section and the at least one riser. The securement is a magnet that creates a magnetic force between the lid at the step assembly, and there is no securement structure substantially extending from the top surfaces of either the step section or the riser section.

In the above and other illustrative embodiments, the vehicle may also comprise: the lid including at least one receiver plate and the securement being attached to the step assembly; the at least one receiver plate being configured to be magnetically attracted to the securement to hold the lid over the opening of the step assembly; the lid including the securement and the at least one receiver plate being attached to the step assembly, wherein the at least one receiver plate is configured to be magnetically attracted to the securement to hold the lid over the opening of the step assembly; the at least one receiver plate being made of galvanized steel having a sufficient attraction to the magnet when in close proximity thereto to keep the lid closed unless lifted open; the magnet aligning the lid over the opening; and a compression seal being located between the lid and the step assembly.

Another illustrative embodiment of the present disclosure provides a vehicle that comprises an entrance to an interior compartment of the vehicle; a step assembly located adjacent the entrance of the vehicle and comprising at least one step and at least one riser; the at least one riser being attached to and substantially perpendicular to the at least one step; the step assembly including an opening; the opening being formed in a portion of the at least one step; a lid comprising an at least one step section; the lid including a hinge that allows selective movement of the lid between open and closed positions with respect to the opening in the step assembly; the lid covering the opening in the step assembly when in the closed position; the lid including a top surface and an underside surface; a securement being located between the underside surface of the lid and the step assembly; the securement being a magnet that creates a magnetic force between the lid and the step assembly; and there being no securement structure extending from the top surfaces of the lid.

In the above and other illustrative embodiments, the vehicle may also comprise: the lid including at least one receiver plate and the securement being attached to the step assembly, wherein the at least one receiver plate being configured to be magnetically attracted to the securement to hold the lid over the opening of the step assembly; the lid including the securement and the at least one receiver plate being attached to the step assembly; wherein the at least one receiver plate is configured to be magnetically attracted to the securement to hold the lid over the opening of the step assembly; the at least one receiver plate being made of galvanized steel having a sufficient attraction to the magnet when in close proximity thereto to keep the lid closed unless lifted open; the magnet aligning the lid over the opening; and a compression seal being located between the lid and the step assembly.

Additional features of the present disclosure will become apparent to those skilled in the art upon consideration of illustrative embodiments including the best mode of carrying out the disclosure as presently perceived.

BRIEF DESCRIPTION OF THE DRAWINGS

The present disclosure will be described hereafter with reference to the attached drawings which are given as non-limiting examples only, in which.

DETAILED DESCRIPTION

Figure 1:
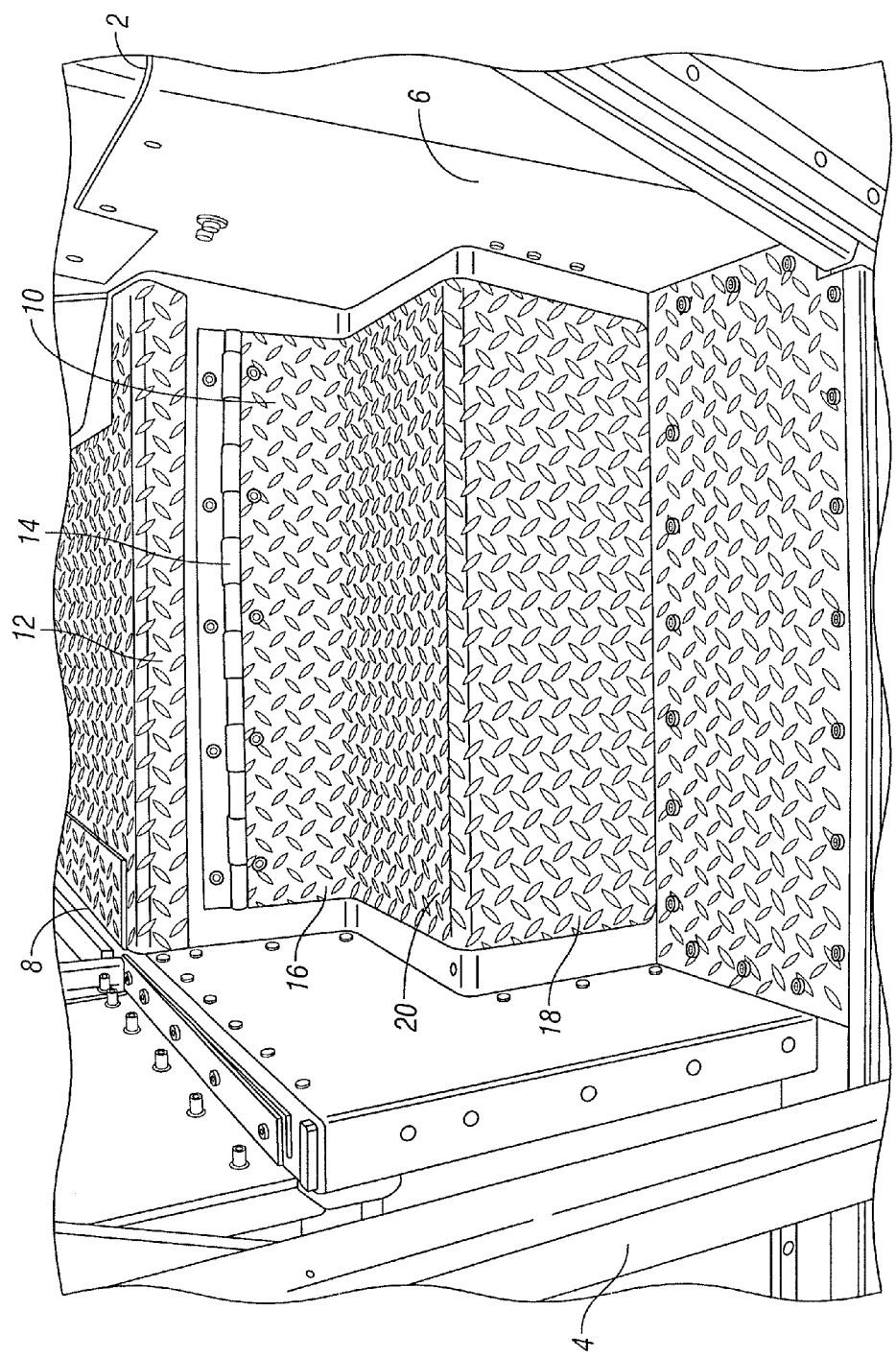
FIG. 1 is a perspective view of a vehicle entrance showing steps leading to a vehicle's interior compartment, wherein a step-well exists underneath the steps, the steps also serve as a movable lid or cover for the step-well.

A perspective view of an entrance to vehicle 4 with steps 6 extending to the interior 8 of vehicle 4 is shown in FIG. 1. This view shows lid 10 hingedly attached to riser 12 via hinges 14. It is appreciated that lid 10 may include a plurality of riser sections 16 and 18 with step 20 located there between substantially conforming to the shape of step 6 of vehicle 4. This being the case, it is appreciated that the steps formed by lid 10 include no structures to hold them in place as they could otherwise be perceived as a hazard to a person walking up and down them. It may not even be noticeable that lid 10 is anything but a set of steps.

Figure 2:
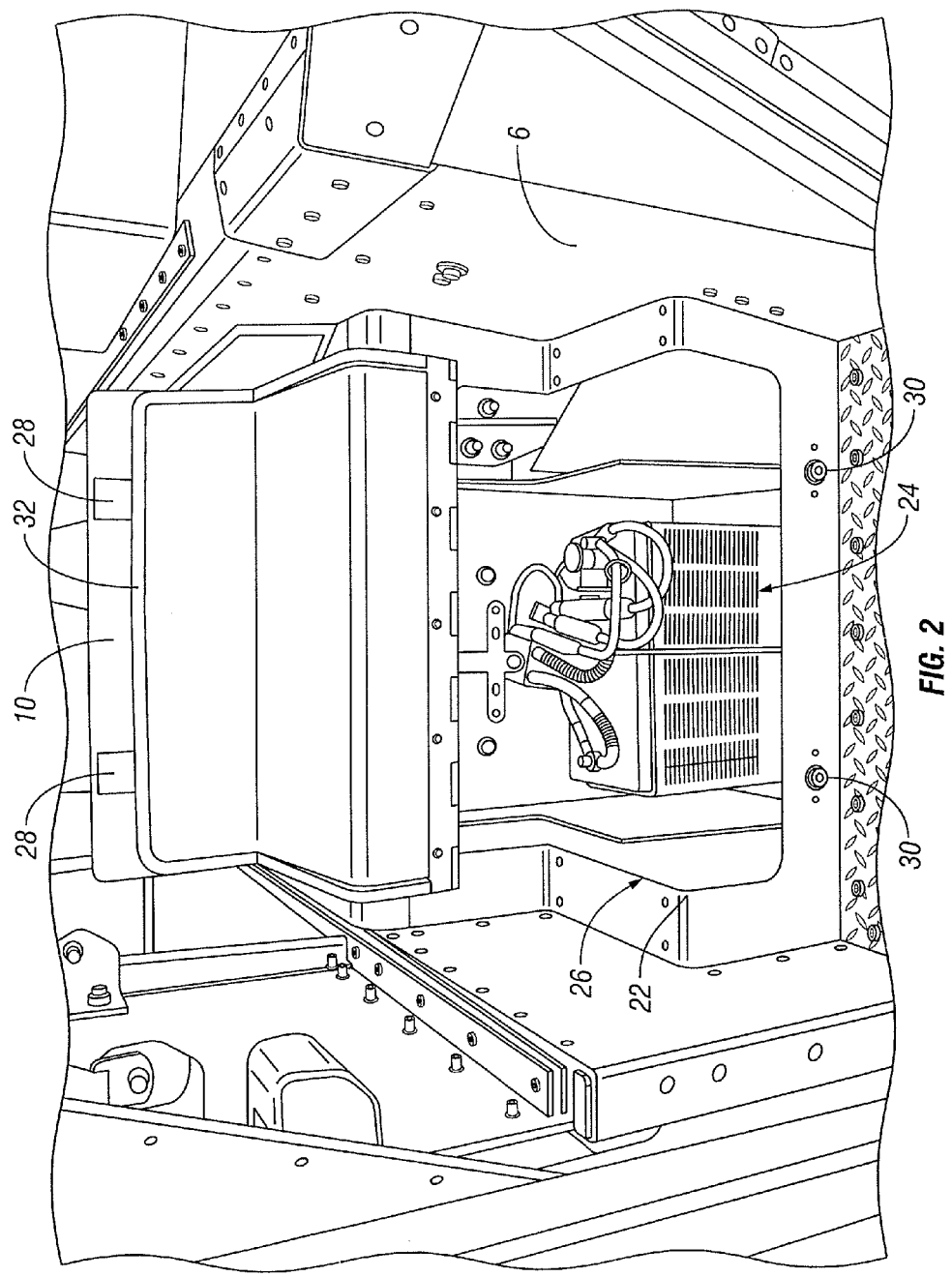
FIG. 2 is another perspective view of the steps of FIG. 1 with the cover in the opened position showing the step-well underneath.

A perspective view of steps 6 from FIG. 1 showing lid 10 in the upright position exposing a step-well 22 located within step 6 is shown in FIG. 2. In this embodiment, step-well 22 is a battery compartment which houses battery 24, as illustratively shown. It is appreciated that step-well 22 may be configured to serve any numerous other functions for the vehicle, such as engine or transmission access, or generator or storage compartments.

Surrounding the periphery of step-well 22, assisting forming the same, is frame 26. This frame outlines the shape of the steps, as well as serving as the upper periphery for step-well 22. The underside of lid 10 includes receiver plates 28 configured to engage magnets 30 on the lower portion of frame 26. It is appreciated that in other embodiments, a magnet or magnets may be attached to either lid 10 or frame 26. Conversely, plates 28 may be attached to the frame or lid to engage the magnets. In the illustrated embodiment, receiver plates 28 on lid 10 engage magnets 30 which hold lid 10 in place via magnetic force. This creates a secure hold of lid 10 against steps 6 while not requiring any fastening means external to the lid. Cumbersome fasteners or straps that could possibly serve as an obstacle to a person stepping into the vehicle are no longer necessary. Also shown in this view is a seal 32 illustratively positioned about the periphery of a portion of the underside of lid 10 configured to keep debris out of step-well 22.

In another illustrative embodiment, receiver plates 28 may also be attached to lid 10 (or alternatively the frame) via rivets or other similar non-protruding fasteners. It is contemplated that the rivets will be deposed through lid 10 with the heads either counter sunk therein or protruding only an insubstantial amount from the surface of lid 10. The rivets or fasteners may provide an even more secure hold onto the lid or frame to ensure sufficient durability and, thus, extend product life.

Figure 3:
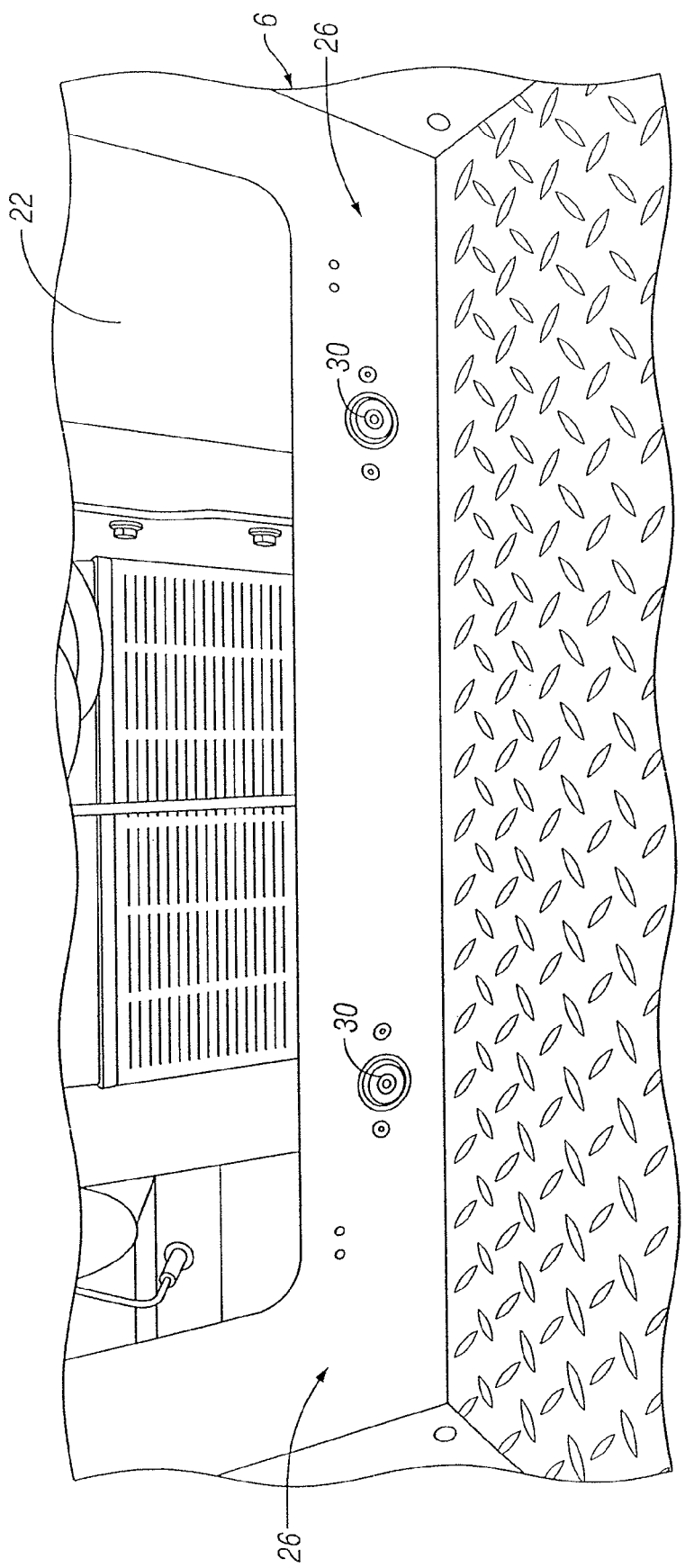
FIG. 3 is a detailed view of a frame portion of the step-well which includes magnets attached thereto.

A detailed view of frame 26 located about step-well 22 and forming a portion of steps 6 is shown in FIG. 3. This view better shows illustrative positioning of magnets 30 attached to frame 26. It is appreciated that the magnets may be strong enough to create about a 39 pound pull force from frame 26. Illustratively, these magnets may have a more than ten year operating life and can be easily replaced with one fastener. An illustrative embodiment of receiver plates 28 may be galvanized steel plates that have a strong attraction to the magnets when in close proximity thereto. It is further appreciated that lid 10 is secured using the magnets and will be self-aligning and self-adjusting. In addition, compressing the seal may not have an appreciable effect on the magnetic pull of magnets 30 to receiver plates 28.

Figure 4:
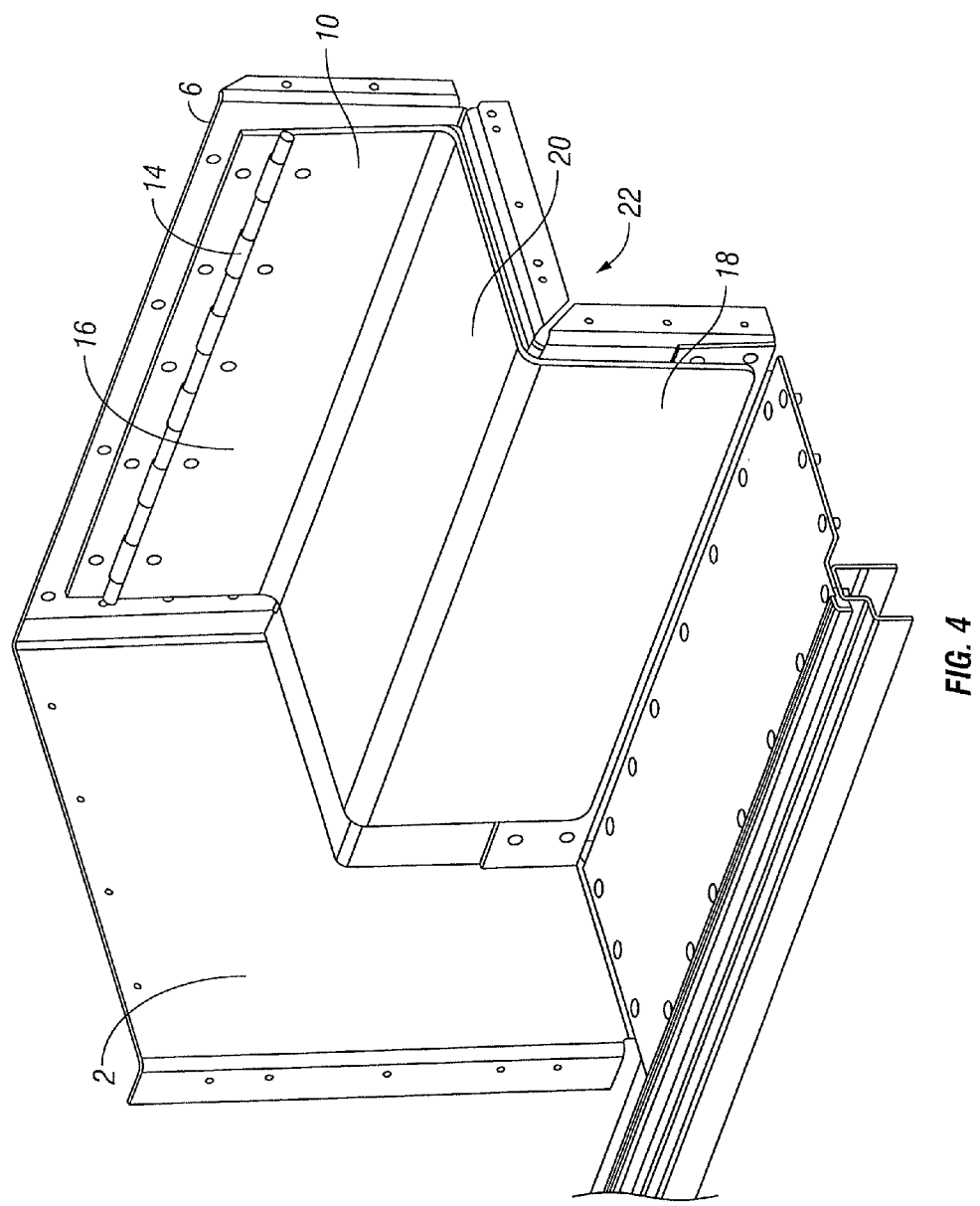
FIG. 4 is an isometric, detailed view of the step portion of the vehicle showing the step cover in the closed position.

An isometric detail view of steps 6 of vehicle entrance 2 is shown in FIG. 4. This view further illustrates how lid 10 is positioned on the steps and includes riser sections 16 and 18 along with step 20 concealing step-well 22 underneath. This view further helps illustrate how the absence of any bulky mechanical fasteners extending substantially from the exterior of lid 10, particularly those in the prior art used on riser section 18, creates a less intrusive step environment.

Figure 5:
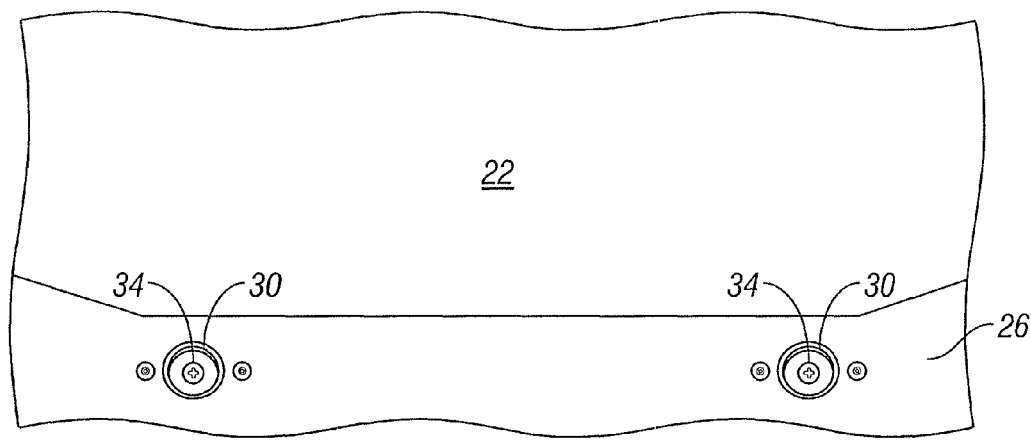
FIG. 5 is another detailed view of a portion of the frame of the step-well showing magnets attached thereto.

A detailed view of a portion of frame 26 is shown in FIG. 5. This is an in-board looking view of step-well 22. In this view, magnets 30 are shown attached to frame 26 via fasteners 34. This means if one or both magnets 30 become bad or wear out, all that is needed to replace magnet 30 is removing fastener 34. There are no brackets, complicated procedures, or tools needed to replace the magnet.

Figure 6:
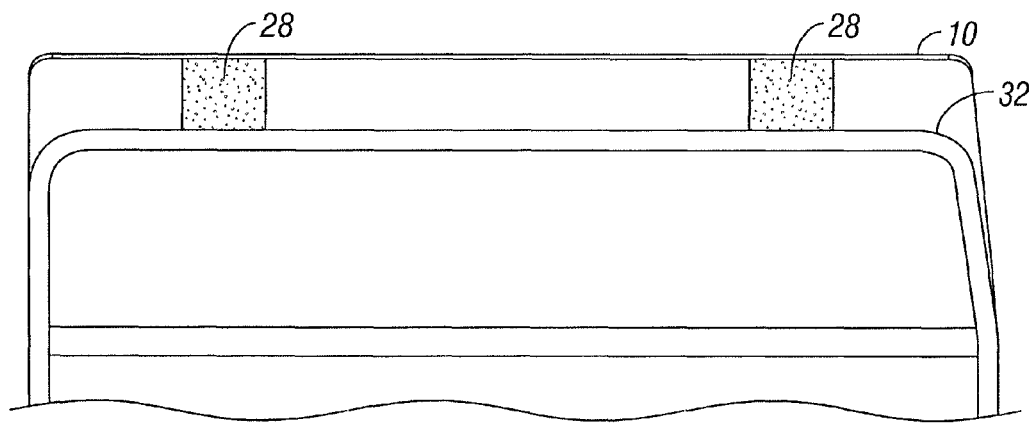
FIG. 6 is a detailed view of a portion of the underside of the step cover showing illustrative contact plates and seal.

A detailed view of a portion of the underside of lid 10 is shown in FIG. 6. This view shows the galvanized receiver plates 28 configured to engage and be held by magnets 30. Also shown is seal 32, positioned about the periphery of step-well 22 in order to keep debris out, as previously discussed.

It is appreciated that the galvanized treated steel plates resist corrosion over time. It is also appreciated that a high-bonding structural adhesive may be used to hold the plates in place on the cover which is to make a secure attachment. It is appreciated that the cover is typically made from aluminum.

The present disclosure has been described with reference to particular means, materials, and embodiments. Additionally, the summary and claims as originally filed are incorporated into, and form a portion of, this detailed description as well. From the foregoing, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A vehicle comprising:
an entrance to an interior compartment of the vehicle;
a step assembly located adjacent the entrance of the vehicle and comprising at least one step and at least one riser;
wherein the at least one riser is attached to and substantially perpendicular to the at least one step;
wherein the step assembly includes an opening that allows access behind the step assembly;
wherein the opening is formed from both a portion of the at least one riser and a portion of the at least one step;
wherein the at least one riser and the at least one step are configured to attract or produce a magnetic force;
a lid comprising an at least one step section and an at least one riser section;
wherein the lid includes a hinge that allows selective movement of the lid between open and closed positions with respect to the opening in the step assembly;
wherein the lid covers the opening in the step assembly when in the closed position such that the at least one step section rests on the portion of the at least one step adjacent the opening, and the at least one riser section abuts the portion of the at least one riser adjacent the opening;
wherein the at least one step section and the at least one riser section each includes a top surface and an underside surface;
wherein a securement is attached to the underside surface of either or both the at least one step section and the at least one riser section;
wherein the securement is either a magnet which includes a magnetic force or a material that attracts a magnetic force;
wherein the attraction between the at least one step and the at least one riser to the lid secures the lid to the at least one step and at least one riser; and
wherein there is no securement structure extending from the top surfaces of either the step section or the riser section.

2. The vehicle of claim 1, wherein the lid is hingedly attached to the at least one riser by the hinge.

3. The vehicle of claim 1, wherein the at least one riser section of the lid includes first and second riser sections and the at least one step section is located between the first and second riser sections;
wherein the step assembly includes a second riser wherein the step is located between the at least one riser and the second riser;
wherein the step assembly includes an opening that allows access behind the step assembly;
wherein the opening is formed from the portion of the at least one riser, the portion of the at least one step, and a portion of the second riser;
wherein the hinge of the lid is attached to the second riser section of the lid and the portion of the second riser of the step assembly to allow selective movement of the lid between open and closed positions with respect to the opening in the step assembly; and
wherein the securement is a magnet which includes a magnetic force attracted toward the at least one step and the at least one riser.

4. The vehicle of claim 1, wherein the securement is not substantially visible above the top surface of the at least one step and riser sections.

5. The vehicle of claim 1, wherein behind the opening is a battery compartment.

6. The vehicle of claim 1, wherein behind the opening is a storage area housing structures selected from the group consisting of engine, transmission, generator, and storage compartment.

7. The vehicle of claim 1, wherein the step assembly is in the form of a step-well.

8. The vehicle of claim 1, wherein the portion of the at least one riser and the portion of the at least one step forms a periphery about the opening that includes a frame.

9. The vehicle of claim 8, wherein the underside of the lid includes a plurality of receiver plates configured to engage at least one magnet located on the frame.

10. The vehicle of claim 1, further comprising a seal located about a periphery of a portion of an underside of the lid and configured to block debris.

11. A vehicle comprising:
an entrance to an interior compartment of the vehicle;
a step assembly located adjacent the entrance of the vehicle and comprising at least one step and at least one riser;
wherein the at least one riser is attached to and substantially perpendicular to the at least one step;
wherein the step assembly includes an opening;

wherein the opening is formed in a portion of the at least one riser;
a lid comprising an at least one riser section;
wherein the lid includes a hinge that allows selective movement of the lid between open and closed positions with respect to the opening in the step assembly;
wherein the at least one riser section of the lid covers the opening in the step assembly when in the closed position;
wherein the at least one riser section includes a top surface and an underside surface;
wherein a securement is located between the underside surface of the at least one riser section and the at least one riser;
wherein the securement is a magnet that creates a magnetic force between the lid and the step assembly; and
wherein there is no securement structure extending from the top surfaces of either the step section or the riser section.

12. The vehicle of claim 11, wherein the lid includes at least one receiver plate and the securement is attached to the step assembly; wherein the at least one receiver plate is configured to be magnetically attracted to the securement to hold the lid over the opening of the step assembly.

13. The vehicle of claim 11, wherein the lid includes the securement and the at least one receiver plate is attached to the step assembly; wherein the at least one receiver plate is configured to be magnetically attracted to the securement to hold the lid over the opening of the step assembly.

14. The vehicle of claim 11, wherein the at least one receiver plate is made of galvanized steel having a sufficient attraction to the magnet when in close proximity thereto to keep the lid closed unless lifted open.

15. The vehicle of claim 11, wherein the magnet aligns the lid over the opening.

16. The vehicle of claim 11, wherein a compression seal is located between the lid and the step assembly.

17. A vehicle comprising:
an entrance to an interior compartment of the vehicle;
a step assembly located adjacent the entrance of the vehicle and comprising at least one step and at least one riser;
wherein the at least one riser is attached to and substantially perpendicular to the at least one step;
wherein the step assembly includes an opening;
wherein the opening is formed in a portion of the at least one step;
a lid comprising an at least one step section;
wherein the lid includes a hinge that allows selective movement of the lid between open and closed positions with respect to the opening in the step assembly;
wherein the lid covers the opening in the step assembly when in the closed position;
wherein the lid includes a top surface and an underside surface;
a securement is located between the underside surface of the lid and the step assembly;
wherein the securement is a magnet that creates a magnetic force between the lid and the step assembly; and
wherein there is no securement structure extending from the top surfaces of the lid.

18. The vehicle of claim 17, wherein the lid includes at least one receiver plate and the securement is attached to the step assembly; wherein the at least one receiver plate is configured to be magnetically attracted to the securement to hold the lid over the opening of the step assembly.

19. The vehicle of claim 17, wherein the lid includes the securement and the at least one receiver plate is attached to the step assembly; wherein the at least one receiver plate is configured to be magnetically attracted to the securement to hold the lid over the opening of the step assembly.

20. The vehicle of claim 17, wherein the at least one receiver plate is made of galvanized steel having a sufficient attraction to the magnet when in close proximity thereto to keep the lid closed unless lifted open.

21. The vehicle of claim 17, wherein the magnet aligns the lid over the opening.

22. The vehicle of claim 17, wherein a compression seal is located between the lid and the step assembly.

* * * * *